US010710325B2

(12) United States Patent
Olah

(10) Patent No.: US 10,710,325 B2
(45) Date of Patent: Jul. 14, 2020

(54) TUBULAR PROTECTOR ASSEMBLY

(71) Applicant: Laslo Olah, Richardson, TX (US)

(72) Inventor: Laslo Olah, Richardson, TX (US)

(*) Notice: Subject to any disclaimer, the term of this patent is extended or adjusted under 35 U.S.C. 154(b) by 0 days.

(21) Appl. No.: 16/474,192

(22) PCT Filed: Dec. 29, 2017

(86) PCT No.: PCT/US2017/069058
§ 371 (c)(1),
(2) Date: Jun. 27, 2019

(87) PCT Pub. No.: WO2018/126196
PCT Pub. Date: Jul. 5, 2018

(65) Prior Publication Data
US 2019/0344524 A1 Nov. 14, 2019

Related U.S. Application Data

(60) Provisional application No. 62/440,352, filed on Dec. 29, 2016.

(51) Int. Cl.
*E21B 17/10* (2006.01)
*B32B 1/08* (2006.01)
(52) U.S. Cl.
CPC ............ *B32B 1/08* (2013.01); *E21B 17/1007* (2013.01); *E21B 17/1085* (2013.01)
(58) Field of Classification Search
CPC .. E21B 17/10; E21B 17/1085; E21B 17/1007; B32B 1/08
See application file for complete search history.

(56) References Cited

U.S. PATENT DOCUMENTS

| 3,480,094 | A | * | 11/1969 | Morris | E21B 17/1042 175/325.5 |
| 3,741,252 | A | * | 6/1973 | Williams | E21B 17/105 138/110 |
| 5,049,422 | A | | 9/1991 | Honma | |
| 5,303,744 | A | * | 4/1994 | Eriksson | F16L 59/12 138/110 |
| 5,437,342 | A | * | 8/1995 | Powada | E21B 17/1085 166/242.1 |

(Continued)

FOREIGN PATENT DOCUMENTS

DE 102015211545 11/2016

OTHER PUBLICATIONS

International Search Report, PCT/US2017/069058, dated Mar. 6, 2018.

*Primary Examiner* — Matthew R Buck
(74) *Attorney, Agent, or Firm* — Scott T. Griggs; Griggs Bergen LLP

(57) ABSTRACT

A tubular protector assembly for handling a tubular, such as drill pipe, is disclosed. In one embodiment, a cylindrical sleeve is configured to be disposed around the tubular. One or more layers of carbon fiber-based tape are configured to be interposed between the tubular and the cylindrical sleeve, which includes a cage having open cells formed therein. Each of the open cells including a multilayer cellular structural member therein having an outer-facing external steel plate, an internal plastic filament plate, an internal middle steel plate, and an inner-facing internal steel plate concentrically engaged theretogether.

10 Claims, 4 Drawing Sheets

(56) References Cited

U.S. PATENT DOCUMENTS

| | | | |
|---|---|---|---|
| 5,553,640 A | 9/1996 | Ferenczy et al. | |
| 5,791,379 A * | 8/1998 | Piorkowski | F16L 9/00 |
| | | | 138/110 |
| 7,784,547 B2 * | 8/2010 | Reddy | E21B 36/003 |
| | | | 137/375 |
| 8,119,047 B2 * | 2/2012 | Moore | E21B 17/1042 |
| | | | 264/242 |
| 2002/0038727 A1 * | 4/2002 | Moore | E21B 41/0078 |
| | | | 175/325.5 |
| 2004/0216323 A1 | 11/2004 | Scherb et al. | |
| 2006/0272724 A1 * | 12/2006 | Borland | F16L 55/1686 |
| | | | 138/99 |
| 2013/0278016 A1 | 10/2013 | Kia et al. | |

\* cited by examiner

TUBULAR PROTECTOR ASSEMBLY

PRIORITY STATEMENT & CROSS-REFERENCE TO RELATED APPLICATIONS

This application is the National Stage of, and therefore, claims the benefit of International Application No. PCT/US2017/069058 filed Dec. 29, 2017; which claims priority from U.S. Provisional Patent Application No. 62/440,352, entitled "Slip Assembly for Drill Pipe" and filed on Dec. 29, 2016, in the names of Laslo Olah et al; both of which are hereby incorporated by reference for all purposes.

TECHNICAL FIELD OF THE INVENTION

This invention relates, in general, to handling of drill pipe or other tubular members in a vertical position, and, in particular, to tubular protector assemblies, which are useful in oilfield operations for drilling, hoisting, or placing or removing any tubular member from a wellbore, for example.

BACKGROUND OF THE INVENTION

Without limiting the scope of the present disclosure, its background will be described with reference to the addition or removal of pipe from the top end of the drill string. During the addition or removal of pipe from a drill string, it is often necessary to suspend the drill string by a drill string assembly that includes a slip assembly which is mounted in the floor of the drilling rig and through which the drill string extends downwardly into a borehole. During these handling and holding operations, scratching and other deformations of the drill string become an issue at the slip assembly as the weight of the drill pipe in the drill string requires the use of teeth within the slip assembly to bite and forcefully hold the drill string. Accordingly, a need exists for improvements in oil field technology that prevent the scratching and deformation of drill strings during the holding of oil field piping and other operations.

SUMMARY OF THE INVENTION

It would be advantageous to achieve a tubular protector assembly that would improve upon existing limitations in functionality. It would also be desirable to enable a mechanical-based solution that would prevent the scratching and deformation of pipe assemblies, such as drill strings, during the holding and hoisting of oil field piping and other operations. To better address one or more of these concerns, a tubular protector assembly, for handling a tubular, such as drill pipe, is disclosed. In one embodiment, a cylindrical sleeve is configured to be disposed around the tubular. One or more layers of carbon fiber-based tape are configured to be interposed between the tubular and the cylindrical sleeve, which includes a cage having open cells formed therein. Each of the open cells including a multilayer cellular structural member therein having an outer-facing external steel plate, an internal plastic filament plate, an internal middle steel plate, and an inner-facing internal steel plate concentrically engaged theretogether. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1A:
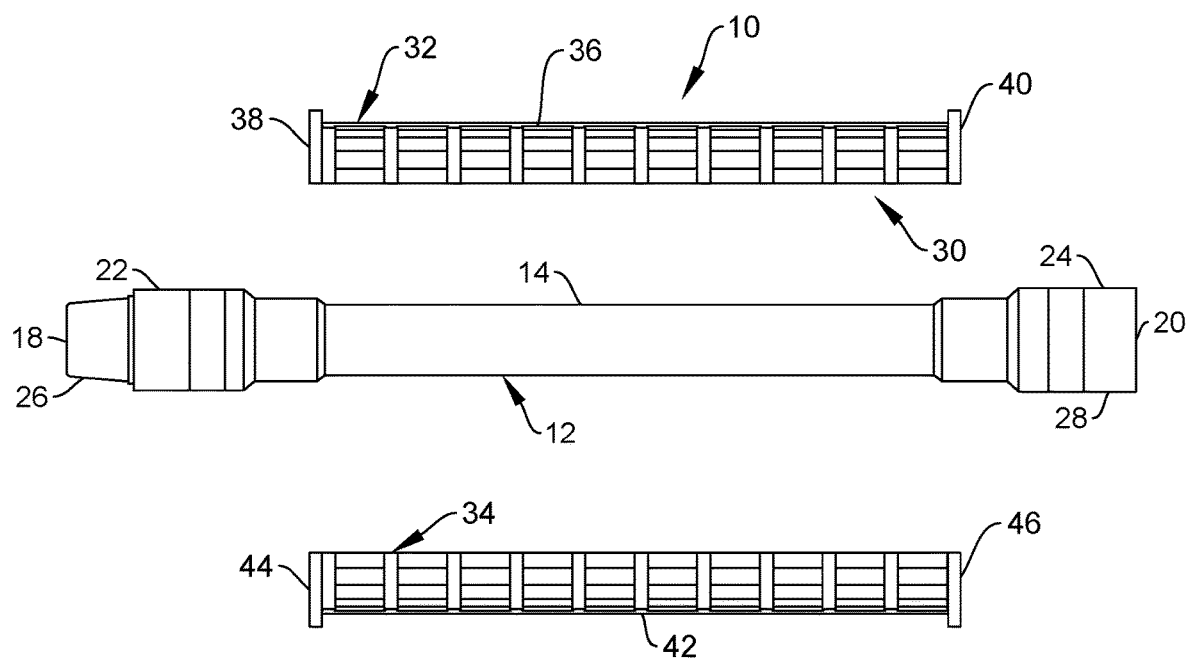
FIG. 1A is a side elevation view of one embodiment of a tubular, which is depicted as a drill pipe, having a tubular protector assembly being prepared for installation thereon, according to the teachings presented herein.
Figure 1B:
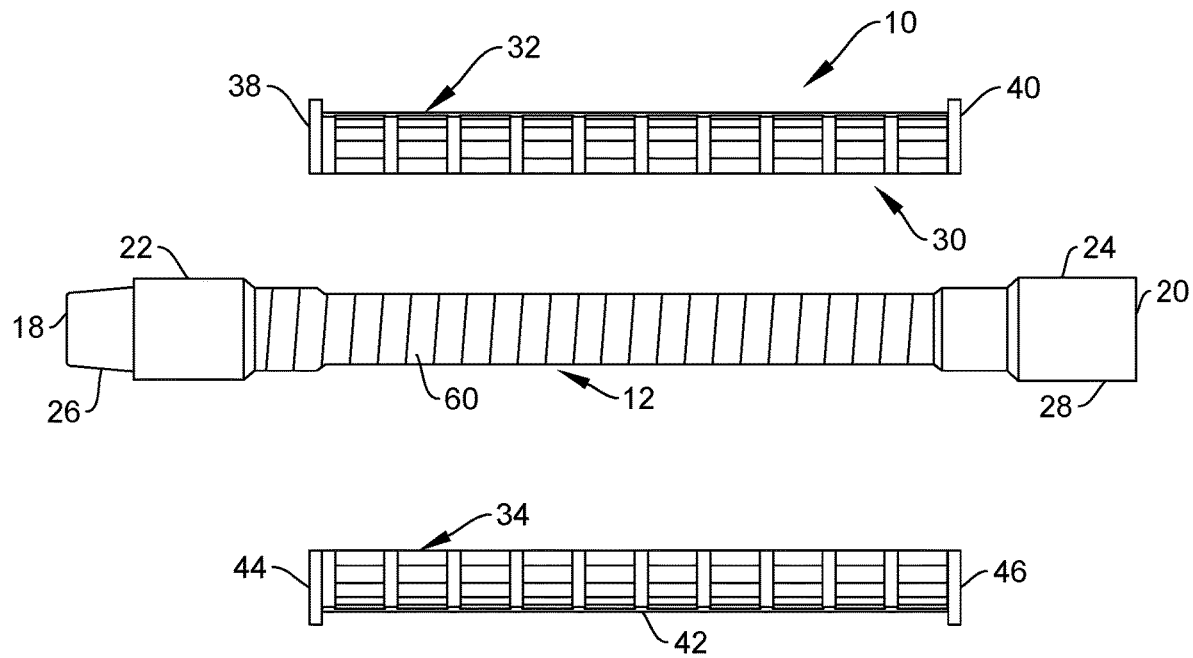
FIG. 1B is a side elevation view of the tubular in FIG. 1A having the tubular protector assembly being installed thereon.
Figure 1C:
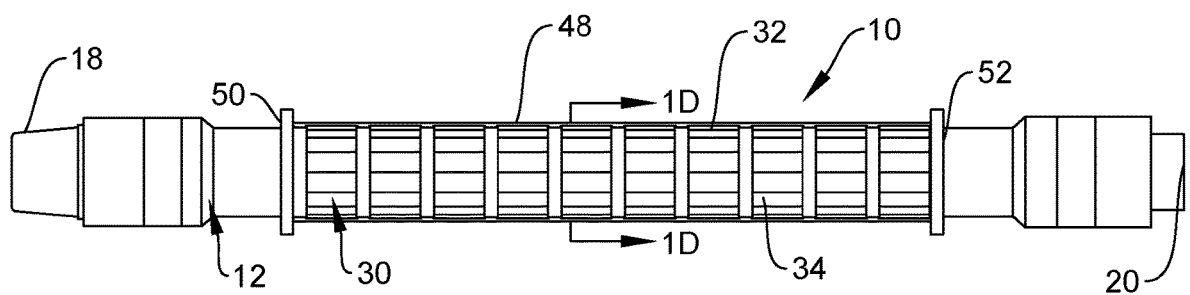
FIG. 1C is a side elevation view of the tubular in FIG. 1A having the tubular protector assembly thereon.
Figure 1D:
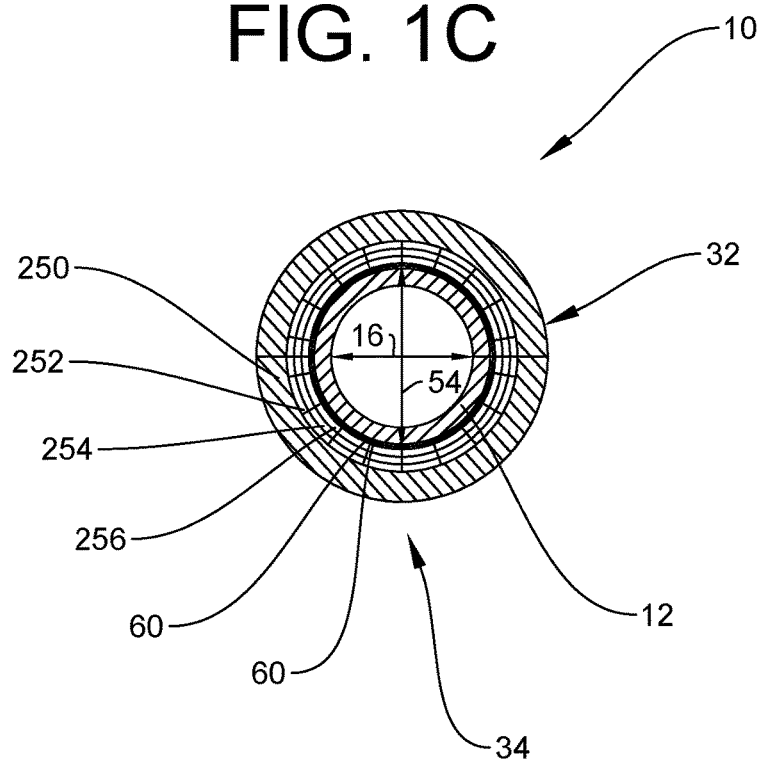
FIG. 1D is a front elevation view of the tubular in FIG. 1C along the lines 1D-1D.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1A, FIG. 1B, FIG. 1C, FIG. 1D, FIG. 2, and FIG. 3, therein is depicted one embodiment of a tubular protector assembly 10 for handling a tubular 12, such as, for example, drill pipe. As shown, the tubular 12 includes a long tubular section 14 with a specified outside diameter 16 and ends 18, 20, which may be larger in diameter. Respective tool joints 22, 24 are located at the ends 18, 20 and depicted as pin 26 and box 28.

In one embodiment, the tubular protector assembly 10 may include a cylindrical sleeve 30 having multiple cylindrical sleeve segments, such as cylindrical sleeve segment 32 and cylindrical sleeve segment 34, that are configured to be interconnected to form the cylindrical sleeve 30. In another embodiment, the cylindrical sleeve 30 may have a greater number of segments or the cylindrical sleeve 30 may be unitary in construction. As shown, the cylindrical sleeve segment 34 includes a tubular body 36 having ends 38, 40. Similarly, the cylindrical sleeve segment 34 includes a tubular 42 having ends 44, 46. As illustrated, when the cylindrical sleeve 30 is completely formed, the cylindrical sleeve 30 includes a tubular body 48 having ends 50, 52 with an inner diameter 54. The inner diameter 54 is configured to be disposed around the outer diameter 16 of the tubular 12. It should be appreciated that the cylindrical sleeve 30 and corresponding cylindrical sleeve segments 32, 34 may be the entire length of the tubular 12 or a portion of the length thereof as illustrated in the figures. The cylinder sleeve may be constructed to hold 7,000 lbs in weight in some implementations. Additionally, the inner diameter 54 and the outer diameter 16 of the cylinder sleeve 30 may be circular or non-circular or a combination thereof.

One or more layers of carbon fiber-based tape 60 are configured to be interposed between the outer diameter 16 of the tubular 12 and the inner diameter 54 of the cylindrical sleeve 30. The cylindrical sleeve 30 may be a carbon prepreg or include boron fibers. In one implementation, the cylindrical sleeve 30 may include a cage 70 having multiple radially extending ridges interconnected with multiple axially extending ridges. Open cells are formed within the cage 70. Each of the open cells includes a multilayer cellular structural member therein. In one embodiment, the multilayer cellular structural member includes an outer-facing external steel plate, an internal plastic filament plate, an internal middle steel plate, and an inner-facing internal steel plate concentrically engaged theretogether. The outer-facing external steel plate may have a higher coefficient of friction than the outer diameter of the tubular.

Figure 2:
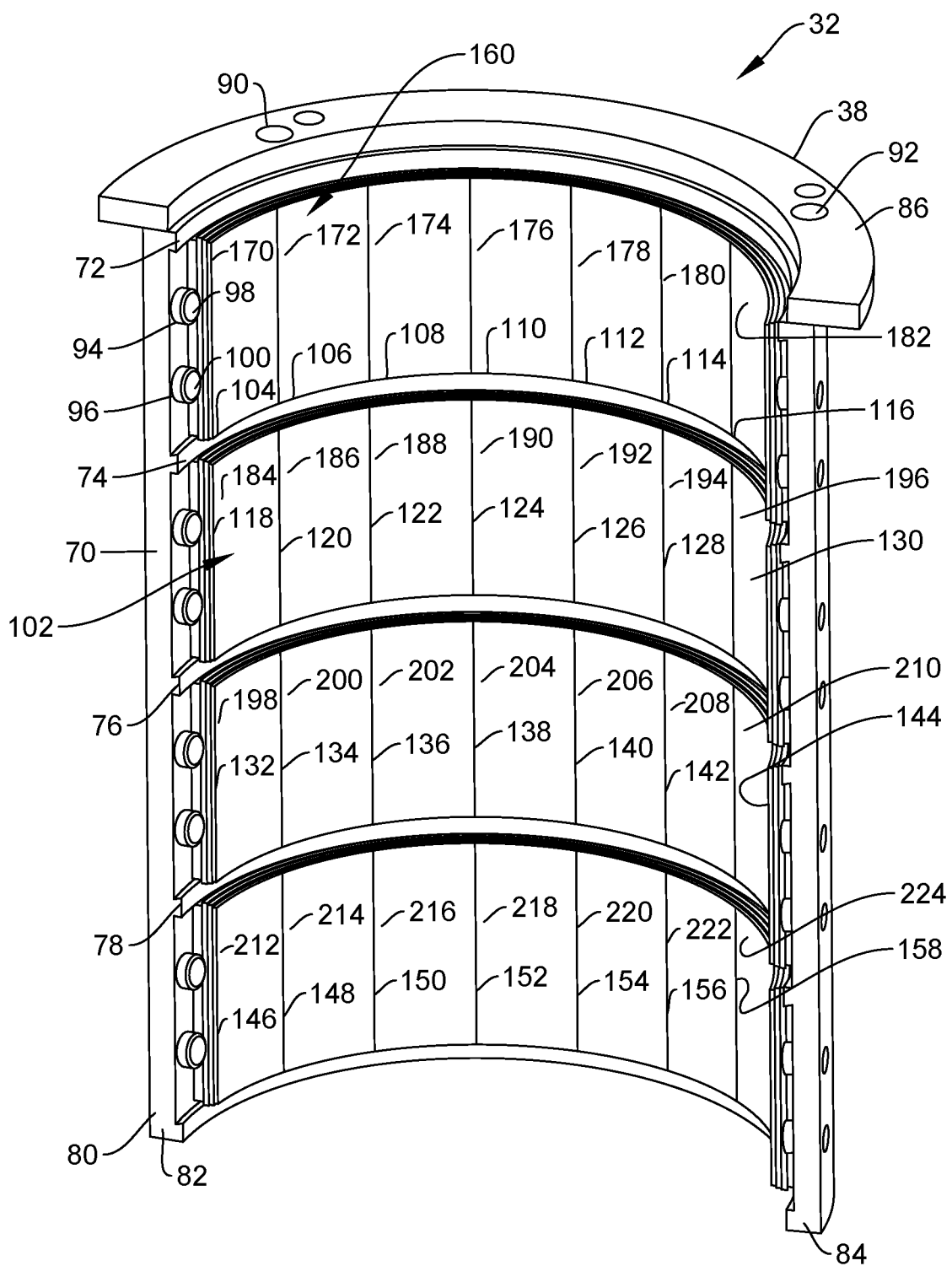
FIG. 2 is an interior perspective view of one embodiment of the tubular protector assembly.
Figure 3:
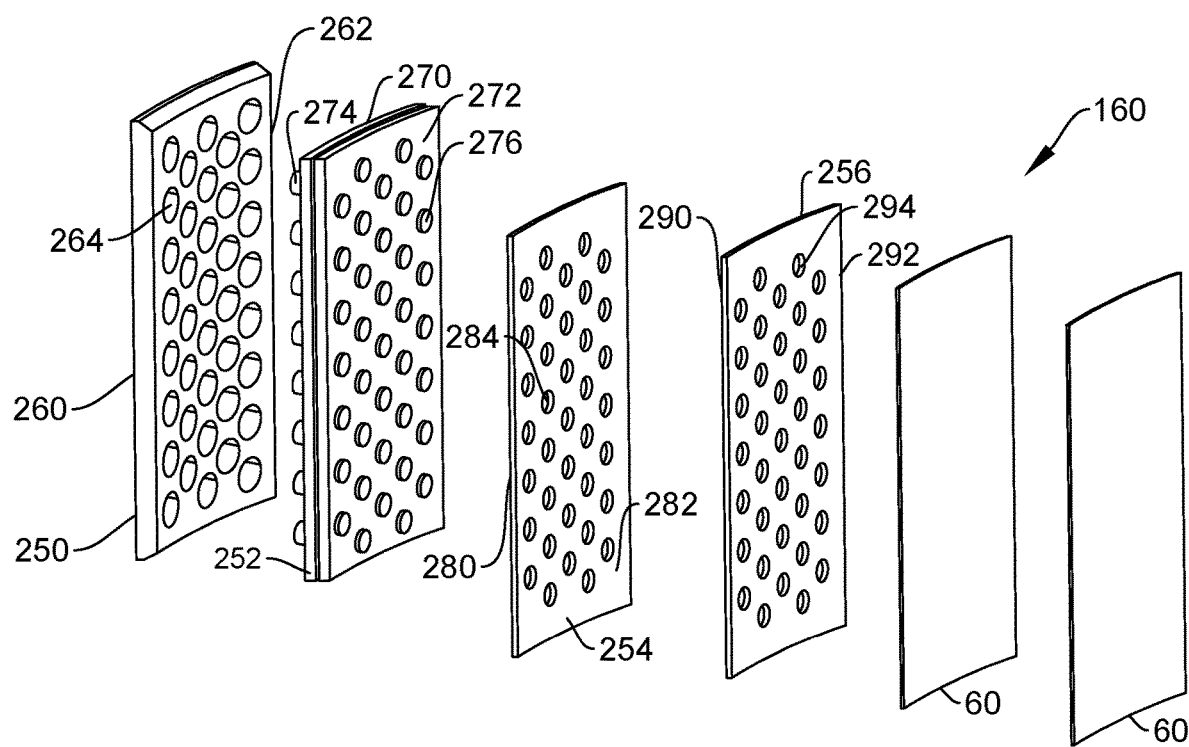
FIG. 3 is a perspective view of one embodiment of components of the tubular protector assembly.

By way of example, a portion of the cylindrical sleeve 30, namely, an upper portion of the cylindrical sleeve segment 32 is depicted in FIG. 2. In FIG. 2, the cage 70 has multiple radially extending ridges, such as radially extending ridges 72, 74, 76, 78, 80, interconnected with multiple axially extending ridges, such as axially extending ridges 82, 84. An end coupling member 86 is positioned at the end 38. The end coupling member 86 may be utilized to join the cylindrical sleeve segment 32 to the cylindrical sleeve segment 34. Various openings, such as openings 90, 92 accept fasteners for the connection. Similarly, openings, such as openings 94, 96, accept fasteners, such as fasteners 98, 100, for the connections associated with the radially extending ridges 72, 74, 76, 78, 80 and the axially extending ridges 82, 84.

Open cells 102 are formed within the cage, including open cells 104, 106, 108, 110, 112, 114, 116, 118, 120, 122, 124, 126, 128, 130, 132, 134, 136, 138, 140, 142, 144, 146, 148, 150, 152, 154, 156, 158. Each of the open cells includes a multilayer cellular structural member 160 therein, including multilayer cellular structural members 170, 172, 174, 176, 178, 180, 182, 184, 186, 188, 190, 192, 194, 196, 198, 200, 202, 204, 206, 208, 210, 212, 214, 216, 218, 220, 222, 224. It should be appreciated that although a specific matrix architecture is depicted in FIG. 2, the matrix architecture, including the number, size, shape, and placement of the open cells and the multilayer cellular structural members may vary and such variations are within the teachings presented herein.

Returning to the description of FIG. 1A through FIG. 3, in one embodiment, the multilayer cellular structural member 160 includes an outer-facing external steel plate 250, an internal plastic filament plate 252, an internal middle steel plate 254, and an inner-facing internal steel plate 256 concentrically engaged theretogether. As previously discussed, one or more layers of carbon fiber-based tape 60 may be positioned subjacent to the inner-facing internal steel plate 256.

In one embodiment, the outer-facing external steel plate 250 includes an outer-facing side 260 and an inner-facing side 262 with perforations 264 traversing the outer-facing external steel plate 250. The outer-facing external steel plate 250 may have a higher coefficient of friction than the outer diameter 16 of the tubular 12. The internal plastic filament plate 252 includes an outer-facing side 270 and an inner-facing side 272 with forward facing pegs 274 extending from the outer-facing side 270 and rear facing pegs 276 extending from the inner-facing side 272. In one embodiment, the forward facing pegs 274 mate with the perforations 264 of the outer-facing external steel plate 250. The internal middle steel plate 254 includes a forward facing side 280 and a rear facing side 282. Perforations 284 may traverse the internal middle steel plate. The inner-facing internal steel plate 256 may be similarly constructed to the internal middle steel plate 254 and include a forward facing side 290, a rear facing side 292, and perforations 294 therethrough. In one implementation, the rear facing pegs 276 of the internal plastic filament plate 252 couple to both the perforations 284 and perforations 294 to join the internal middle steel plate 254 and the inner-facing internal steel plate 256 to the internal plastic filament plate 252.

In one implementation, the teachings presented herein relative to the tubular protector assembly provide a sleeve structure having a cellular matrix system with individual blocks incorporated into the cellular matrix system. As mentioned, each of the blocks may include a sandwich design with the cellular matrix system placed on flexible back-net that holds the entire sleeve structure together and ensures flexibility. The sleeve structure may be prefabricated in form to fit various tubulars having different lengths and outside diameters. The flexible back-net may be shipped and stored in a flat, sheet-like format and used when it is necessary to wrap and dress a tubular.

The tubular protector assembly 10 presented herein may protect tubulars from various tools, such as toothed surfaces of slips and mitigate or completely avoid scratching. The tubular protector assembly 10 may be flexible in construction or shell-like with pre-fabricated components or a combination thereof. Further, the cellular and matrix based construction may homogenous, or different in vertical or horizontal directions. That is, the geometry may vary. As such, the outer surface may be continuous or segmented.

The order of execution or performance of the methodologies illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A tubular protector assembly for handling a tubular comprising:
   a cylindrical sleeve having an inner diameter configured to be disposed around an outer diameter of the tubular;
   a plurality of layers of carbon fiber-based tape configured to be interposed between the outer diameter of the tubular and the inner diameter of the cylindrical sleeve; and
   the cylindrical sleeve including:
      a cage having a plurality of radially extending ridges interconnected with a plurality of axially extending ridges,
      a plurality of open cells formed within the cage, and
      each of the plurality of open cells including a multilayer cellular structural member therein, the multilayer cellular structural member having an outer-facing external steel plate, an internal plastic filament plate, an internal middle steel plate, and an inner-facing internal steel plate concentrically engaged theretogether.

2. The tubular protector assembly as recited in claim 1, wherein the cylindrical sleeve further comprises a plurality of cylindrical sleeve segments configured to be interconnected to form the cylindrical sleeve.

3. The tubular protector assembly as recited in claim 1, wherein the carbon fiber-based tape further comprises a carbon prepreg.

4. The tubular protector assembly as recited in claim 1, wherein the carbon fiber-based tape further comprises boron fibers.

5. The tubular protector assembly as recited in claim 1, wherein the cylindrical sleeve is configured to hold 7,000 lbs in weight.

6. The tubular protector assembly as recited in claim 1, wherein the cylindrical sleeve further comprises an outer diameter, the outer diameter being circular.

7. The tubular protector assembly as recited in claim 1, wherein the cylindrical sleeve further comprises an outer diameter, the outer diameter being non-circular.

8. The tubular protector assembly as recited in claim 1, wherein the outer-facing external steel plate has a higher coefficient of friction than the outer diameter of the tubular.

9. A tubular protector assembly for handling a tubular comprising:
  a plurality of cylindrical sleeve segments configured to be interconnected to form a cylindrical sleeve, the cylindrical sleeve having an inner diameter configured to be disposed around an outer diameter of the tubular;
  one or more layers of carbon fiber-based tape configured to be interposed between the outer diameter of the tubular and the inner diameter of the cylindrical sleeve, the carbon fiber-based tape including a carbon prepreg having boron fibers; and
  the cylindrical sleeve including:
    a cage having a plurality of radially extending ridges interconnected with a plurality of axially extending ridges,
    a plurality of open cells formed within the cage,
    each of the plurality of open cells including a multi-layer cellular structural member therein, the multi-layer cellular structural member having an outer-facing external steel plate, an internal plastic filament plate, an internal middle steel plate, and an inner-facing internal steel plate concentrically engaged theretogether, and
    the outer-facing external steel plate has a higher coefficient of friction than the outer diameter of the tubular.

10. A tubular protector assembly for handling a tubular comprising:
  a plurality of cylindrical sleeve segments configured to be interconnected to form a cylindrical sleeve, the cylindrical sleeve having an inner diameter configured to be disposed around an outer diameter of the tubular;
  a plurality of layers of carbon fiber-based tape configured to be interposed between the outer diameter of the tubular and the inner diameter of the cylindrical sleeve; and
  the cylindrical sleeve including:
    a cage having a plurality of radially extending ridges interconnected with a plurality of axially extending ridges,
    a plurality of open cells formed within the cage,
    each of the plurality of open cells including a multi-layer cellular structural member therein, the multi-layer cellular structural member having an outer-facing external steel plate, an internal plastic filament plate, an internal middle steel plate, and an inner-facing internal steel plate concentrically engaged theretogether, and
    the outer-facing external steel plate has a higher coefficient of friction than the outer diameter of the tubular.

\* \* \* \* \*